(12) United States Patent
Park et al.

(10) Patent No.: US 11,127,984 B2
(45) Date of Patent: Sep. 21, 2021

(54) LITHIUM SECONDARY BATTERY INCLUDING CYLINDRICAL JELLY ROLL

(71) Applicant: LG CHEM, LTD., Seoul (KR)

(72) Inventors: Jong-Hoon Park, Daejeon (KR);
Joo-Hwan Sung, Daejeon (KR);
Han-Gab Song, Daejeon (KR);
Pil-Kyu Park, Daejeon (KR);
Sung-Min Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 376 days.

(21) Appl. No.: 16/329,460

(22) PCT Filed: Jun. 26, 2018

(86) PCT No.: PCT/KR2018/007238
§ 371 (c)(1),
(2) Date: Feb. 28, 2019

(87) PCT Pub. No.: WO2019/004706
PCT Pub. Date: Jan. 3, 2019

(65) Prior Publication Data
US 2019/0260089 A1   Aug. 22, 2019

(30) Foreign Application Priority Data

Jun. 27, 2017   (KR) .......................... 10-2017-0081481

(51) Int. Cl.
*H01M 10/0587*      (2010.01)
*H01M 10/052*       (2010.01)
(Continued)

(52) U.S. Cl.
CPC ....... *H01M 10/0587* (2013.01); *H01M 4/525* (2013.01); *H01M 10/04* (2013.01);
(Continued)

(58) Field of Classification Search
None
See application file for complete search history.

(56) References Cited

U.S. PATENT DOCUMENTS

| 2003/0099880 A1 | 5/2003 | Park et al. |
| 2004/0161662 A1 | 8/2004 | Kim et al. |
(Continued)

FOREIGN PATENT DOCUMENTS

| JP | 2007-80795 A | 3/2007 |
| JP | 2016-21412 A | 2/2016 |
(Continued)

OTHER PUBLICATIONS

International Search Report (PCT/ISA/210) issued in PCT/KR2018/007238, dated Oct. 1, 2018.

*Primary Examiner* — Christopher P Domone
(74) *Attorney, Agent, or Firm* — Birch, Stewart, Kolasch & Birch, LLP

(57) ABSTRACT

A lithium secondary battery is provided which includes a cylindrical jelly roll in which an electrode assembly having a stacked structure including a positive electrode is wound cylindrically, wherein a semi-cylindrical first winding core and second winding core are spaced apart from each other by a predetermined interval, the positive electrode includes a non-coated portion sheet having a positive electrode tab fused thereto and a coated portion sheet, and the non-coated portion sheet and the coated portion sheet are attached by a tape to provide the positive electrode, one end of the positive electrode is positioned at the core portion of the cylindrical jelly roll, and a portion of the positive electrode having the tape is positioned around a circumference of the winding core member such that it avoids a portion where the first winding core is spaced apart from the second winding core by the predetermined interval.

8 Claims, 5 Drawing Sheets

(51) Int. Cl.
*H01M 4/525* (2010.01)
*H01M 2/26* (2006.01)
*H01M 10/04* (2006.01)
*H01M 50/531* (2021.01)
*H01M 50/538* (2021.01)
*H01M 4/02* (2006.01)

(52) U.S. Cl.
CPC ....... *H01M 10/052* (2013.01); *H01M 50/531* (2021.01); *H01M 50/538* (2021.01); *H01M 2004/028* (2013.01)

(56) References Cited

U.S. PATENT DOCUMENTS

| | | | |
|---|---|---|---|
| 2007/0059590 A1* | 3/2007 | Hayashi | H01M 10/0431 429/94 |
| 2011/0117405 A1 | 5/2011 | Lim | |
| 2015/0140381 A1* | 5/2015 | Kim | H01M 10/0431 429/94 |
| 2016/0322622 A1* | 11/2016 | Kishimoto | B65H 75/00 |

FOREIGN PATENT DOCUMENTS

| | | |
|---|---|---|
| KR | 10-2000-0019348 A | 4/2000 |
| KR | 10-2004-0074507 A | 8/2004 |
| KR | 10-2007-0081549 A | 8/2007 |
| KR | 10-2008-0066315 A | 7/2008 |
| KR | 10-2011-0054312 A | 5/2011 |
| KR | 10-2013-0052410 A | 5/2013 |
| KR | 10-2014-0019241 A | 2/2014 |
| KR | 10-2015-0049370 A | 5/2015 |
| KR | 10-2015-0049519 A | 5/2015 |

* cited by examiner

US 11,127,984 B2

LITHIUM SECONDARY BATTERY INCLUDING CYLINDRICAL JELLY ROLL

TECHNICAL FIELD

The present disclosure relates to a lithium secondary battery including a cylindrical jelly roll. More particularly, the present disclosure relates to a lithium secondary battery including a cylindrical jelly roll, which can prevent cracking in a positive electrode core portion by avoiding overlap of a winding core member with a tape attached to the positive electrode.

The present application claims priority to Korean Patent Application No. 10-2017-0081481 filed on Jun. 27, 2017 in the Republic of Korea, the disclosures of which are incorporated herein by reference.

BACKGROUND ART

As technological development and demand for mobile instruments have been increased, secondary batteries as energy sources for such mobile instruments are increasingly in demand. Among such secondary batteries, many studies have been conducted about lithium secondary batteries having high energy density and discharge voltage, and such lithium secondary batteries have been commercialized and used widely.

Secondary batteries are classified, depending on shapes of battery casings, into cylindrical batteries and prismatic batteries, wherein an electrode assembly is received in a cylindrical or prismatic metallic can, and pouch-type batteries, wherein an electrode assembly is received in a pouch-type casing made of an aluminum laminate sheet.

In addition, the electrode assembly received in the battery casing is a power generation device capable of charging/discharging and including a stacked structure of positive electrode/separator/negative electrode. Such electrode assemblies are substantially classified into jelly roll types formed by interposing a separator between an elongated sheet-like positive electrode and negative electrode and winding them, stack types formed by stacking a plurality of positive electrodes and negative electrodes having a predetermined size with separators between a positive electrode and a negative electrode, and stacked/folded types formed by winding stack type unit cells with a long separator film. Among such electrode assemblies, jelly roll type electrode assemblies are advantageous in that they are manufactured most easily and have high energy density per weight.

In the jelly roll electrode assembly, a sheet-like electrode assembly including a stack of a sheet-like positive electrode, a sheet-like separator and a sheet-like negative electrode is wound in a cylindrical shape, or the like. At the core portion (central portion) of the cylindrical jelly roll, a semi-cylindrical first winding core and second winding core are spaced apart from each other by a predetermined interval while facing each other. Thus, the jelly roll electrode assembly is wound through a winding core member having a cylindrical shape as a whole.

FIG. 1 is a schematic view illustrating a portion where the coated portion and non-coated portion of a sheet-like positive electrode are attached, and FIG. 2 is a schematic view illustrating a portion where a tape is attached in a sheet-like positive electrode.

Referring to FIG. 1 and FIG. 2, the sheet-like positive electrode 110 is obtained by individually forming a non-coated portion sheet 111 that is positioned at one end of the positive electrode, is not coated with an active material and has a positive electrode tab 112 fused thereto and a coated portion sheet 113 which occupies the whole portions of the positive electrode except one end thereof and is coated with an active material, overlapping the non-coated portion sheet 111 with the coated portion sheet 113 by a predetermined length, and taping the overlapped portion with a tape 114. The obtained sheet-like positive electrode and negative electrode are stacked with a separator interposed therebetween, and then are wound through a winding core member so that the positive electrode tab may be positioned at the core portion of a cylindrical jelly roll. In this manner, it is possible to obtain a cylindrical jelly roll.

Meanwhile, among such cylindrical jelly rolls, a positive electrode using, as a positive electrode active material, a nickel (Ni)-rich positive electrode active material has a problem in that cracking may occur at the core portion of the positive electrode during the winding step due to various causes, such as an increase in water content in the electrode, overlapping at the stepped portion in the winding core member, or the like. Since the positive electrode using such a Ni-rich positive electrode active material is more sensitive to moisture, it shows higher brittleness as compared to the positive electrodes using the other positive electrode active materials, and undergoes degradation of folding endurance during long-term storage. It is thought that the tape portion present at the core portion having a large curvature is overlapped with the stepped portion of the winding core member (i.e. the portion where the first winding core and the second winding core are spaced apart from each other by a predetermined interval) during the winding step to cause concentration of stress, resulting in a damage upon the positive electrode current foil.

According to the related art, to improve such cracking problems, approaches have been made largely in a chemical point of view during the process for manufacturing an electrode by modifying the positive electrode active material, using a flexible binder, or the like.

DISCLOSURE

Technical Problem

The present disclosure is directed to providing a lithium secondary battery including a cylindrical jelly roll in order to solve the problem of cracking at the core portion of a positive electrode by approaching it in a mechanical point of view, not a chemical point of view.

Technical Solution

In one aspect of the present disclosure, there is provided a lithium secondary battery which includes a cylindrical jelly roll in which a sheet-like or sheet shaped electrode assembly having a stacked structure of a sheet-like or sheet shaped positive electrode, a sheet-like or sheet shaped separator and a sheet-like or sheet shaped negative electrode is wound cylindrically, wherein a semi-cylindrical first winding core and a semi-cylindrical second winding core are spaced apart from each other by a predetermined interval at the core portion of the cylindrical jelly roll, while facing each other, so that the core portion may include a winding core member having a cylindrical shape as a whole, wherein the sheet shaped positive electrode includes a non-coated portion sheet that is positioned at one end of the sheet shaped positive electrode, is not coated with an active material and has a positive electrode tab fused thereto and a coated portion sheet which occupies the whole of the positive electrode except one end thereof and is coated with an active material, and the non-coated portion sheet and the coated portion sheet are attached by a tape to provide the sheet shaped positive electrode, while they are overlapped with each other by a predetermined length, wherein the one end of the sheet shaped positive electrode is positioned at the core portion of the cylindrical jelly roll, and wherein a portion of the sheet shaped positive electrode having the tape is positioned around a circumference of the winding core member such that the tape avoids a portion where the first winding core is spaced apart from the second winding core by the predetermined interval.

Herein, the lithium secondary battery may take a form in which the winding core member is eliminated.

In addition, the active material applied to the sheet shaped positive electrode may be a nickel (Ni)-rich positive electrode active material.

In addition, the sheet shaped separator may have a length larger than a length of the sheet shaped positive electrode and a length of the sheet shaped negative electrode.

Meanwhile, the portion of the sheet shaped positive electrode having the positive electrode tab fused thereto may be positioned at the portion where the first winding core is spaced apart from the second winding core by the predetermined interval.

In addition, the tape may be made of polypropylene.

Further, the predetermined length of the non-coated portion sheet overlapped with the coated portion sheet may be 1/5 to 1/2 of a length of the non-coated portion.

In another aspect of the present disclosure, there is provided a method of forming a lithium secondary battery which comprises a cylindrical jelly roll in which a sheet shaped electrode assembly having a stacked structure of a sheet shaped positive electrode, a sheet shaped separator and a sheet shaped negative electrode is wound cylindrically, the sheet shaped positive electrode having a non-coated portion sheet that is positioned at one end of the sheet shaped positive electrode, is not coated with an active material and has a positive electrode tab fused thereto and a coated portion sheet which occupies the whole of the positive electrode except one end thereof and is coated with an active material, and the non-coated portion sheet and the coated portion sheet are attached by a tape to provide the sheet shaped positive electrode, while they are overlapped with each other by a predetermined length. The method includes providing a semi-cylindrical first winding core and a semi-cylindrical second winding core spaced apart from each other by a predetermined interval and facing each other to form a winding core member having a cylindrical shape as a whole; positioning the one end of the sheet shaped positive electrode on the winding core member to form a core portion of the cylindrical jelly roll; and winding the sheet shaped electrode assembly around the winding core member such that a portion of the sheet shaped positive electrode having the tape is positioned around a circumference of the winding core and avoids the predetermined interval where the first winding core is spaced apart from the second winding core.

Advantageous Effects

According to the present disclosure, the portion having the tape attached to the portion of the positive electrode where the non-coated portion sheet of the sheet-like positive electrode is overlapped with the coated portion sheet by a predetermined length is positioned in such a manner that the portion having the tape may not be overlapped with the stepped portion present in the winding core member of the cylindrical jelly roll. Thus, it is possible to relieve stress concentrated at the core portion of the positive electrode, and thus to prevent generation of cracks at the positive electrode core portion.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DESCRIPTION OF DRAWING NUMERALS

Figure 1:
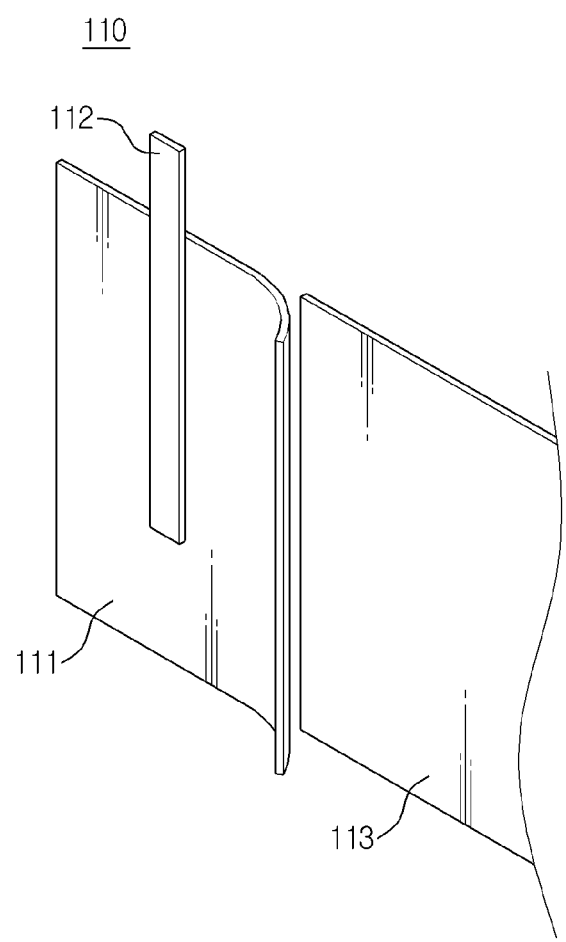
FIG. 1 illustrates a portion where the coated portion and non-coated portion of a sheet-like positive electrode are attached.

1: First winding core
2: Second winding core
10, 100: Cylindrical jelly roll
11, 110: Sheet-like positive electrode
111: Non-coated portion
112: Positive electrode tab
113: Coated portion sheet
114: Tape
12, 120: Sheet-like separator
13, 130: Sheet-like negative electrode

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 4:
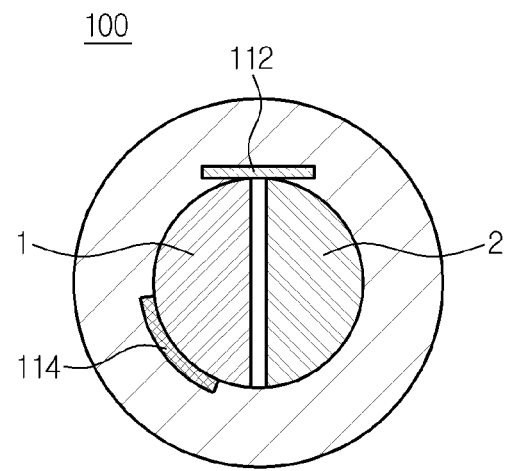
FIG. 4 is a schematic view illustrating the top surface of the cylindrical jelly according to the present disclosure.
Figure 6:
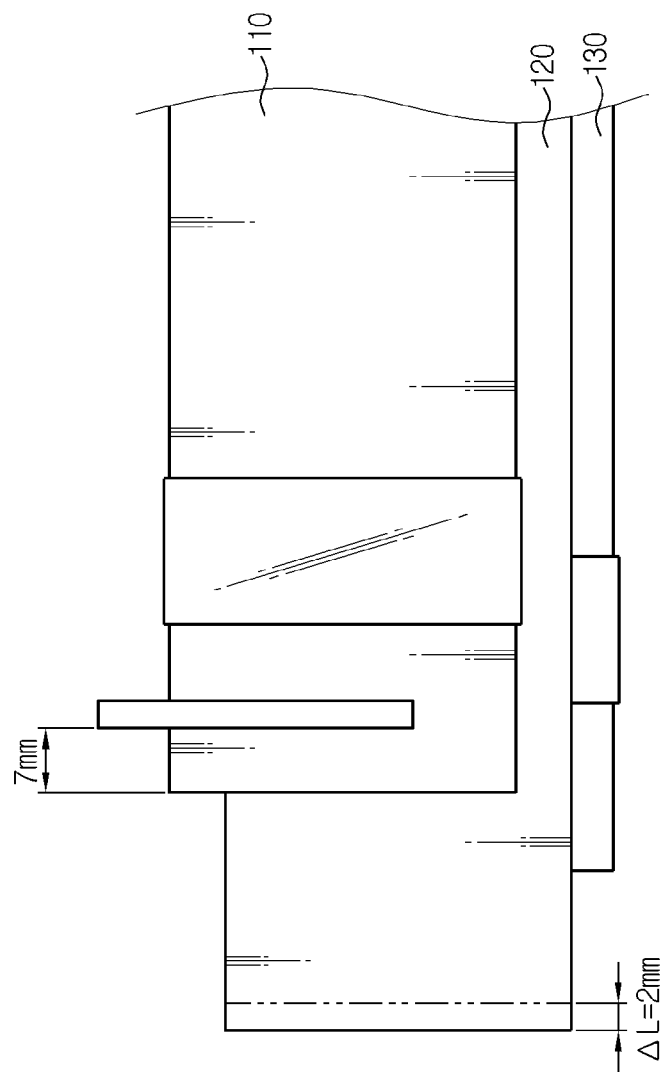
FIG. 6 is a schematic view illustrating the sheet-like electrode assembly according to an embodiment of the present disclosure, before winding.

FIG. 4 is a schematic view illustrating the top surface of the cylindrical jelly according to the present disclosure, and FIG. 6 is a schematic view illustrating the sheet-like electrode assembly according to an embodiment of the present disclosure, before winding.

Figure 2:
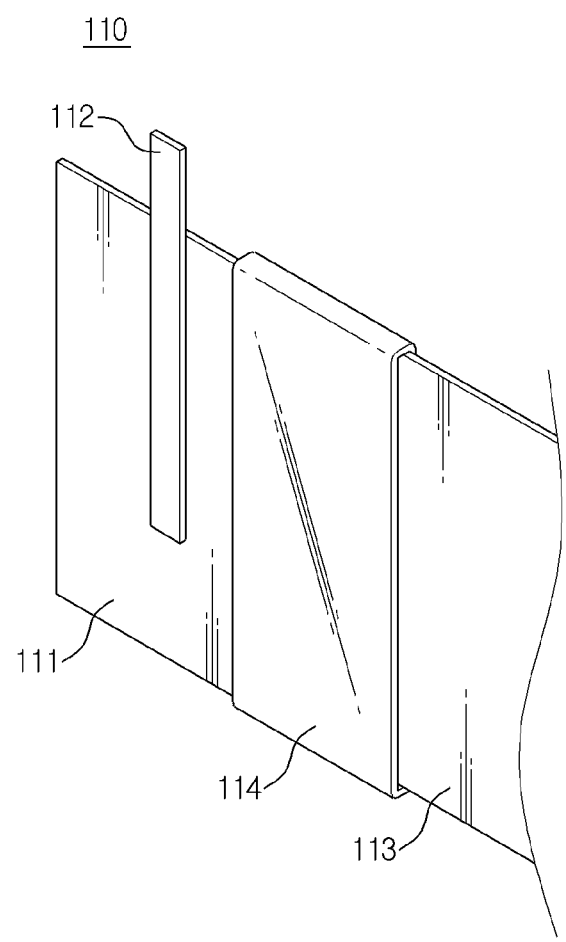
FIG. 2 is a schematic view illustrating a portion where a tape is attached in a sheet-like positive electrode.

Referring to FIG. 2, FIG. 4 and FIG. 6, the lithium secondary battery according to the present disclosure includes a cylindrical jelly roll 100 in which a sheet-like electrode assembly having a stacked structure of a sheet-like positive electrode 110, a sheet-like separator 120 and a sheet-like negative electrode 130 is wound cylindrically, wherein a semi-cylindrical first winding core 1 and second winding core 2 are spaced apart from each other by a predetermined interval at the core portion of the cylindrical jelly roll 100, while facing each other, so that the core portion may include a winding core member having a cylindrical shape as a whole; the sheet-like positive electrode 110 includes a non-coated portion sheet 111 that is positioned at one end of the positive electrode, is not coated with an active material and has a positive electrode tab 112 fused thereto and a coated portion sheet 113 which occupies the whole portions of the positive electrode 110 except one end thereof and is coated with an active material, and the non-coated portion sheet and the coated portion sheet are attached to the positive electrode by a tape 114, while they are overlapped with each other by a predetermined length; one end of the sheet-like positive electrode 110 is positioned at the core portion of the cylindrical jelly roll 100; and the portion of the sheet-like positive electrode having the tape 114 is positioned around the circumference of the winding core member, with the proviso that it avoids the portion where the first winding core 1 is spaced apart from the second winding core 2 by a predetermined interval.

The non-coated portion sheet 111 and the coated portion sheet 113 are attached by the tape 114. Herein, only one surface of the coated portion sheet 113 is coated with the active material and the opposite surface is not coated with the active material. In addition, the non-coated portion sheet 111 may be overlapped with the surface not coated with the active material of the coated portion sheet 113 by a predetermined length, and then the portion may be attached through the tape 114.

Herein, the lithium secondary battery may take a form in which the winding core member is eliminated.

According to the present disclosure, the portion of the sheet-like positive electrode having the tape 114 attached to the portion where the non-coated portion sheet 111 of the sheet-like positive electrode 110 is overlapped with the coated portion sheet 113 by a predetermined length is not overlapped with the stepped portion of the winding core member, i.e. the portion where the first winding core 1 is spaced apart from the second winding core 2 by a predetermined length, but is positioned to avoid the portion. Thus, it is possible to relieve stress concentrated at the positive electrode core portion and to prevent generation of cracks at the positive electrode core portion.

Herein, the tape 114 may be a tape made of polypropylene. For reference, a tape made of polyethylene is not suitable due to its reactivity with HF in the electrolyte, but the tape made of polypropylene is preferred since it has no reactivity with HF.

Meanwhile, the portion of the sheet-like positive electrode having the positive electrode tab 112 fused thereto may be positioned at the portion where the first winding core 1 is spaced apart from the second winding core 2. Herein, the positive electrode tab 112 keeps a balance between the first winding core 1 and the second winding core 2 so that the stress applying to the cylindrical jelly roll 100 formed by winding subsequently may be dispersed suitably.

Figure 3:
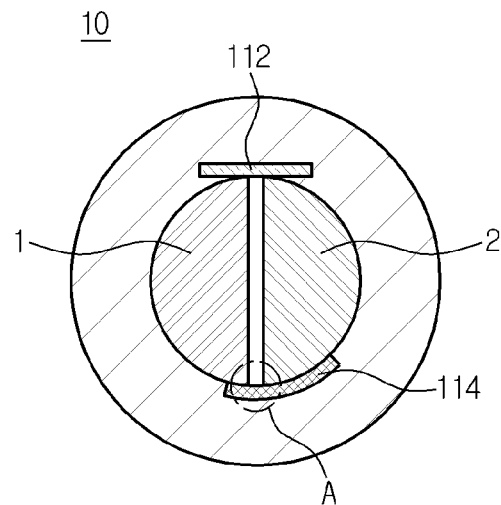
FIG. 3 is a schematic view illustrating the top surface of a cylindrical jelly roll according to the related art.

FIG. 3 is a schematic view illustrating the top surface of a cylindrical jelly roll according to the related art.

Referring to FIG. 3 and FIG. 4, according to the related art, the tape 114 through which the non-coated portion sheet and the coated portion sheet of the sheet-like positive electrode 10 are attached is positioned at the portion A where the first winding core 1 is spaced apart from the second winding core 2. Therefore, stress is concentrated at the portion to cause damages on the positive electrode current collector foil, resulting in cracking at the positive electrode core portion.

However, according to the present disclosure, the tape 114 is positioned to avoid the portion where the first winding core 1 is spaced apart from the second winding core 2. Thus, it is possible to relieve the stress concentrated at the positive electrode core portion, and thus to prevent generation of cracks at the positive electrode core portion.

Meanwhile, the active material applied to the sheet-like positive electrode 110 may be a positive electrode active material used conventionally in the art. However, in order to maximize the effect of the present disclosure, it is preferred to use a nickel (Ni)-rich positive electrode active material having higher brittleness as compared to the other positive electrode active materials. The positive electrode using the Ni-rich positive electrode active material shows a higher tendency to generate cracks at the positive electrode core portion during the winding step due to various causes, such as an increase in moisture content in the electrode, overlapping at the stepped portion of the winding core member, or the like. Since the positive electrode using a Ni-rich positive electrode active material is more sensitive to moisture, it shows higher brittleness as compared to the positive electrodes using the other positive electrode active materials and undergoes degradation of folding endurance during long-term storage.

Particular examples of such Ni-rich positive electrode active materials include NCM811 (oxide for a positive electrode having a weight ratio of nickel, chromium and manganese of 8:1:1), NCM701515 (oxide for a positive electrode having a weight ratio of nickel, chromium and manganese of 70:15:15), or the like.

In the sheet-like electrode assembly, the sheet-like separator 120 may have a larger length as compared to the sheet-like positive electrode 110 and the sheet-like negative electrode 130 in order to prevent an internal short-circuit between a positive electrode and a negative electrode more efficiently. In other words, the sheet-like separator 120 is interposed between the sheet-like positive electrode 110 and the sheet-like negative electrode 130, and is formed to have a larger length as compared to the electrodes at one end and the other end of the sheet-like electrode assembly. As a result, the sheet-like separator 120 may protrude out toward the outside between both electrodes.

Meanwhile, the predetermined length of the non-coated portion sheet overlapped with the coated portion sheet may be ⅓ to ½ of the length of the non-coated portion.

MODE FOR DISCLOSURE

Hereinafter, the present disclosure will be explained in detail with reference to Examples. The following examples are provided so that the present disclosure will be thorough and complete, and will fully convey the scope of the present disclosure to those skilled in the art. However, the present disclosure may be embodied in many different forms and should not be construed as limited to the exemplary embodiments set forth therein.

1. Comparative Example 1

Manufacture of Sheet-Like Electrode Assembly

Figure 5:
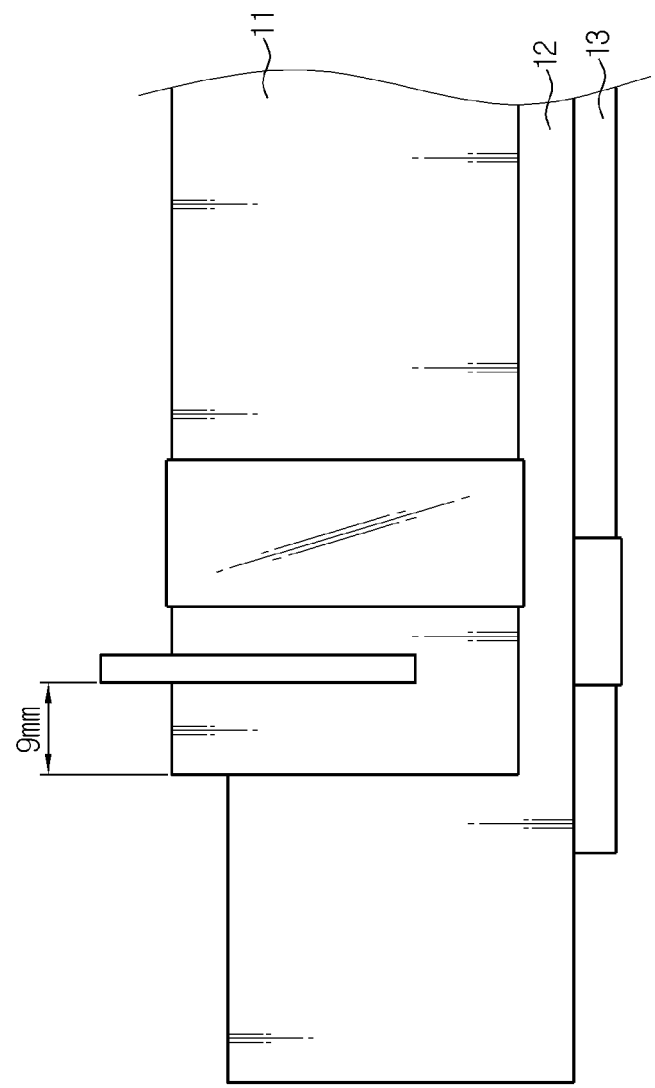
FIG. 5 is a schematic view illustrating a sheet-like electrode assembly according to the related art, before winding.

FIG. 5 illustrates one side of the sheet-like electrode assembly according to a comparative embodiment, before winding.

Referring to FIG. 5, a sheet-like electrode assembly was manufactured by stacking a sheet-like positive electrode 11, a sheet-like separator 12 and a sheet-like negative electrode 13 successively, when viewed from the top. Herein, at one end of the sheet-like positive electrode 11, a non-coated portion sheet that is not coated with an active material and has a positive electrode tab fused thereto and a coated portion sheet that occupies the whole parts of the sheet-like positive electrode except the above-mentioned one end and is coated with an active material are attached, while they are overlapped with each other by a predetermined length.

In the sheet-like electrode assembly, the portion marked in FIG. 5 becomes the core portion of the cylindrical jelly roll. Herein, the positive electrode tab is characterized in that it is spaced apart from the left side of the sheet-like positive electrode by 9 mm.

In addition, the sheet-like separator protrudes by about 50-70 mm as compared to the sheet-like positive electrode and the sheet-like negative electrode and is exposed toward the left side.

2. Example

Manufacture of Sheet-Like Electrode Assembly

FIG. 6 illustrates one side of the sheet-like electrode assembly according to an embodiment of the present disclosure, before winding.

Referring to FIG. 6, the portion marked in FIG. 6 becomes the core portion of the cylindrical jelly roll.

Herein, the sheet-like electrode assembly was manufacture in the same manner as described in Comparative Example, except that the positive electrode tab was spaced apart from the left side of the sheet-like positive electrode 110 by 7 mm, and the sheet-like separator 120 had a length increased by 2 mm at the left side.

3. Manufacture of Cylindrical Jelly Roll and Examination of Cracking

Each of the sheet-like electrode assemblies according to Comparative Example and Example was used to obtain a cylindrical jelly roll by using a winding core member wherein a semi-cylindrical first winding core and second winding core were spaced apart from each other by a predetermined interval while facing each other so that the winding core member might have a cylindrical shape as a whole.

Herein, the portion of the sheet-like separator protruding toward the left side of the sheet-like electrode assembly was inserted between the first winding core and the second winding core, and then winding was carried out to provide a cylindrical jelly roll.

Meanwhile, in the case of Example, the position of the electrode tab is moved toward the left side by 2 mm as compared from Comparative Example. However, the sheet-like separator had a length increased by 2 mm at the left side. As a result, there was no difference in the position where the positive electrode tab was received between Example and Comparative Example.

However, in the case of Comparative Example, the portion where the first winding core was spaced apart from the second winding core was overlapped with the end of the tape. After carrying out tests 5 times, it was shown that the electrode foil portion of the overlapped portion was damaged and cracking was generated in all the 5 tests.

On the contrary, in the case of Example, through the above-mentioned modification in processing conditions, the portion wherein the first winding core is spaced apart from the second winding core was not overlapped with the portion having the tape. After carrying out tests 40 times, it was shown that no overlapping occurred in all the 40 tests and no cracking was generated at the electrode foil portion.

It should be understood that the detailed description are given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

What is claimed is:

1. A lithium secondary battery which comprises a cylindrical jelly roll in which a sheet shaped electrode assembly having a stacked structure of a sheet shaped positive electrode, a sheet shaped separator and a sheet shaped negative electrode is wound cylindrically, wherein a semi-cylindrical first winding core and a semi-cylindrical second winding core are spaced apart from each other by a predetermined interval at a core portion of the cylindrical jelly roll, while facing each other, so that the core portion comprises a winding core member having a cylindrical shape as a whole, wherein the sheet shaped positive electrode comprises a non-coated portion sheet that is positioned at one end of the sheet shaped positive electrode, is not coated with an active material and has a positive electrode tab fused thereto and a coated portion sheet which occupies the whole of the positive electrode except one end thereof and is coated with an active material, and the non-coated portion sheet and the coated portion sheet are attached by a tape to provide the sheet shaped positive electrode, while they are overlapped with each other by a predetermined length, wherein the one end of the sheet shaped positive electrode is positioned at the core portion of the cylindrical jelly roll, and wherein a portion of the sheet shaped positive electrode having the tape is positioned around a circumference of the winding core member such that the tape avoids a portion where the first winding core is spaced apart from the second winding core by the predetermined interval.

2. The lithium secondary battery according to claim 1, which takes a form in which the winding core member is removed from the lithium secondary battery.

3. The lithium secondary battery according to claim 1, wherein the active material applied to the sheet shaped positive electrode is a nickel (Ni)-rich positive electrode active material.

4. The lithium secondary battery according to claim 1, wherein the sheet shaped separator has a length larger than a length of the sheet shaped positive electrode and a length of the sheet shaped negative electrode.

5. The lithium secondary battery according to claim 1, wherein the portion of the sheet shaped positive electrode having the positive electrode tab fused thereto is positioned at the portion where the first winding core is spaced apart from the second winding core by the predetermined interval.

6. The lithium secondary battery according to claim 1, wherein the tape is made of polypropylene.

7. The lithium secondary battery according to claim 1, wherein the predetermined length of the non-coated portion sheet overlapped with the coated portion sheet is ⅕ to ½ of a length of the non-coated portion.

8. A method of forming a lithium secondary battery which comprises a cylindrical jelly roll in which a sheet shaped electrode assembly having a stacked structure of a sheet shaped positive electrode, a sheet shaped separator and a sheet shaped negative electrode is wound cylindrically, the sheet shaped positive electrode having a non-coated portion sheet that is positioned at one end of the sheet shaped positive electrode, is not coated with an active material and has a positive electrode tab fused thereto and a coated portion sheet which occupies the whole of the positive electrode except one end thereof and is coated with an active material, and the non-coated portion sheet and the coated portion sheet are attached by a tape to provide the sheet shaped positive electrode, while they are overlapped with each other by a predetermined length, the method comprising:

providing a semi-cylindrical first winding core and a semi-cylindrical second winding core spaced apart from each other by a predetermined interval and facing each other to form a winding core member having a cylindrical shape as a whole;

positioning the one end of the sheet shaped positive electrode on the winding core member to form a core portion of the cylindrical jelly roll; and winding the sheet shaped electrode assembly around the winding core member such that a portion of the sheet shaped positive electrode having the tape is positioned around a circumference of the winding core and avoids the predetermined interval where the first winding core is spaced apart from the second winding core.

* * * * *